United States Patent
Chang

(10) Patent No.: US 10,200,527 B2
(45) Date of Patent: *Feb. 5, 2019

(54) CONTEXTUAL ALARM AND NOTIFICATION MANAGEMENT

(71) Applicant: Google LLC, Mountain View, CA (US)

(72) Inventor: Walter Chochen Chang, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,249

(22) Filed: Nov. 29, 2017

(65) Prior Publication Data

US 2018/0084104 A1 Mar. 22, 2018

Related U.S. Application Data

(63) Continuation of application No. 13/787,424, filed on Mar. 6, 2013, now Pat. No. 9,854,084.

(51) Int. Cl.
*G08B 19/00* (2006.01)
*H04M 1/725* (2006.01)
*G08B 21/24* (2006.01)

(52) U.S. Cl.
CPC ... *H04M 1/72569* (2013.01); *H04M 1/72522* (2013.01); *G08B 21/24* (2013.01)

(58) Field of Classification Search
CPC .......... H04M 1/72569; H04M 1/72522; G08B 21/24
USPC .......................................................... 340/521
See application file for complete search history.

(56) References Cited

U.S. PATENT DOCUMENTS

| 4,782,521 A | * | 11/1988 | Bartlett | G06Q 10/109 |
| | | | | 379/354 |
| 6,016,141 A | | 1/2000 | Knudson et al. | |
| 6,567,785 B2 | * | 5/2003 | Clendenon | G06Q 10/06398 |
| | | | | 368/89 |
| 7,084,758 B1 | * | 8/2006 | Cole | G06Q 10/109 |
| | | | | 340/309.16 |
| 7,165,098 B1 | * | 1/2007 | Boyer | H04N 21/4782 |
| | | | | 709/219 |

(Continued)

FOREIGN PATENT DOCUMENTS

EP 2367146 A1 9/2011

OTHER PUBLICATIONS

Prosecution History from U.S Appl. No 13/787,424, dated Dec. 18, 2014 through Aug. 30, 2017, 211 pp.

*Primary Examiner* — Zhen Y Wu
(74) *Attorney, Agent, or Firm* — Shumaker Sieffert, P.A.

(57) ABSTRACT

Systems and methods are disclosed for managing alarms and notifications pursuant to contextual cues pertaining to the persisting relevance or utility of such alarms and notifications. The systems and methods involve receiving, at a local computing device comprising an output device, the output device configured to output at least one of visual, aural, and tactile output, input instructing the output device to provide output in the form of a notification at a predetermined time. The systems and methods further involve receiving contextual information at a notification manager, analyzing the contextual information at the notification manager, and cancelling, suppressing, or replacing the notification at the local computing device based on the analysis of the contextual information.

18 Claims, 6 Drawing Sheets

(56) References Cited

U.S. PATENT DOCUMENTS

| | | | |
|---|---|---|---|
| 7,669,136 B1* | 2/2010 | Gaware | G06F 17/30899 715/744 |
| 7,925,525 B2 | 4/2011 | Chin | |
| 8,172,761 B1* | 5/2012 | Rulkov | A61B 5/01 600/301 |
| 8,222,994 B1 | 7/2012 | Sagar | |
| 8,699,862 B1 | 4/2014 | Sharifi et al. | |
| 8,902,714 B2* | 12/2014 | Gossweiler, III | G04G 21/08 368/10 |
| 9,372,092 B2* | 6/2016 | Skillman | G01C 21/3608 |
| 2004/0243547 A1* | 12/2004 | Chhatrapati | G06F 17/30471 |
| 2005/0102607 A1* | 5/2005 | Rousselle | G06F 17/24 715/234 |
| 2005/0222892 A1* | 10/2005 | Sutherland | G06Q 10/0635 705/7.28 |
| 2005/0273493 A1* | 12/2005 | Buford | G06Q 10/109 709/204 |
| 2007/0156494 A1* | 7/2007 | Boss | G06Q 10/109 705/7.19 |
| 2008/0070612 A1* | 3/2008 | Weinans | H04M 1/7253 455/517 |
| 2008/0270761 A1* | 10/2008 | Rasmussen | G06Q 10/10 712/209 |
| 2008/0288023 A1* | 11/2008 | John | A61N 1/37247 607/59 |
| 2009/0157672 A1* | 6/2009 | Vemuri | G09B 19/00 |
| 2009/0192702 A1* | 7/2009 | Bourne | G01C 21/20 701/532 |
| 2009/0210225 A1* | 8/2009 | Simpson | G10L 15/26 704/235 |
| 2009/0212104 A1* | 8/2009 | Smith | G06Q 20/042 235/379 |
| 2009/0259493 A1* | 10/2009 | Venon | G06F 19/3418 705/3 |
| 2010/0036924 A1* | 2/2010 | Naamani | G06Q 10/109 709/206 |
| 2010/0069054 A1* | 3/2010 | Labidi | G01C 21/20 455/418 |
| 2010/0097227 A1* | 4/2010 | Kim | G04C 21/16 340/575 |
| 2010/0169075 A1* | 7/2010 | Raffa | G06F 17/2775 704/9 |
| 2010/0197463 A1* | 8/2010 | Haughay, Jr. | A63B 24/0062 482/8 |
| 2010/0260332 A1* | 10/2010 | Brown | H04M 9/08 379/421 |
| 2011/0003665 A1* | 1/2011 | Burton | G04F 10/00 482/9 |
| 2011/0029620 A1* | 2/2011 | Bonforte | H04L 67/306 709/206 |
| 2011/0205851 A1* | 8/2011 | Harris | G04G 9/0064 368/14 |
| 2011/0215933 A1* | 9/2011 | Darling, IV | G06Q 10/109 340/573.1 |
| 2011/0239158 A1 | 9/2011 | Barraclough et al. | |
| 2011/0294493 A1* | 12/2011 | Nagaraja | H04J 11/0069 455/422.1 |
| 2012/0058783 A1* | 3/2012 | Kim | G06F 1/1626 455/456.2 |
| 2012/0065831 A1* | 3/2012 | Ross | B60L 11/1816 701/29.1 |
| 2012/0232520 A1* | 9/2012 | Sloan | A61B 5/14532 604/504 |
| 2012/0258691 A1 | 10/2012 | Baer et al. | |
| 2012/0265535 A1* | 10/2012 | Bryant-Rich | H04M 1/7255 704/270 |
| 2012/0297416 A1* | 11/2012 | Torrieri | G06Q 30/02 725/32 |
| 2013/0110265 A1* | 5/2013 | Rahko | G06F 19/00 700/91 |
| 2013/0111463 A1* | 5/2013 | Khushraj | G06F 8/61 717/174 |
| 2013/0115927 A1* | 5/2013 | Gruber | H04W 4/16 455/414.1 |
| 2013/0117036 A1* | 5/2013 | Cothren | G06F 19/30 705/2 |
| 2013/0150028 A1* | 6/2013 | Akins | H04W 4/02 455/427 |
| 2013/0214925 A1* | 8/2013 | Weiss | G08B 25/001 340/539.11 |
| 2013/0293363 A1* | 11/2013 | Plymouth | G06Q 20/42 340/309.16 |
| 2013/0307681 A1* | 11/2013 | Borg | G06Q 10/109 340/517 |
| 2014/0045547 A1* | 2/2014 | Singamsetty | G06F 1/1643 455/552.1 |
| 2014/0070945 A1* | 3/2014 | Dave | G08B 21/24 340/540 |
| 2014/0107816 A1* | 4/2014 | Guedalia | G06F 19/3481 700/91 |
| 2014/0189017 A1* | 7/2014 | Prakash | H04W 4/029 709/206 |
| 2014/0203940 A1* | 7/2014 | Bonner | H04W 4/021 340/601 |
| 2014/0253319 A1 | 9/2014 | Chang | |

* cited by examiner

CONTEXTUAL ALARM AND NOTIFICATION MANAGEMENT

RELATED APPLICATION

This application is a continuation of U.S. application Ser. No. 13/787,424, filed Mar. 6, 2013, the entire contents of each of which are hereby incorporated by reference.

BACKGROUND

During recent decades, the number of transistors on integrated circuits has dramatically increased as a result of a dramatic decrease in the size of transistors. At the same time, those same transistors have become substantially faster. As a result, computerized devices have simultaneously become increasingly smaller and more powerful. The consumer electronics marketplace is now densely populated with high powered and ultraportable computerized devices such as smart phones, personal digital assistants (PDAs), and tablet computers. Meanwhile, the expansion of the internet and the development of high speed wireless communication technologies have allowed consumers to use such mobile devices to access ever greater amounts of information and to effortlessly communicate vast amounts of information to other computerized devices.

As a result of their rapidly increasing mobility and capabilities, computerized devices are being used by consumers to accomplish a vast array of tasks. Mobile computerized consumer electronic devices of the modern world can be used to transmit information over the internet, to communicate with other such devices in a variety of manners, to browse the internet, to purchase goods and services via the internet, to listen to music, to watch movies, and to provide information on how to navigate from one point to another, to name just a few of their many capabilities.

Furthermore, many users of such computerized electronic devices find that such devices have become their constant companions. Users of these computerized devices have access to them nearly everywhere they go and almost no matter what they are doing. Many never leave home without them. As a result of the near constant companionship that mobile computerized electronic devices provide to their users, such devices have become a favorite medium for notifying users of upcoming events and reminding users to perform certain tasks. For example, smart phones are frequently used as alarm clocks that wake their users and as personal assistants who remind their users of upcoming meetings and other events.

SUMMARY

Systems and methods are disclosed for adjusting alarms and notifications pursuant to contextual cues pertaining to the persisting relevance or utility of such alarms and notifications. The systems and methods involve receiving input instructing an output device to provide output in the form of a notification or alert at a predetermined time, wherein the output device is configured to output at least one of visual, aural, and tactile output. The systems and methods further involve receiving contextual information at a notification manager, analyzing the contextual information at the notification manager, and adjusting alarms and notifications by issuing instructions for the output device based on the analysis of the contextual information.

According to one embodiment, a system is disclosed comprising a local computing device comprising an output device configured to output at least one of visual, aural, and tactile output, a notification generator configured to receive input and generate a notification, based on the input, that instructs the output device to provide output at a predetermined time, a context information provider configured to gather context information, and a notification manager configured to receive and analyze the context information, and cancel the notification, based on the analysis of the context information, when the context information indicates that the notification is unnecessary.

According to an alternative embodiment, a method is disclosed comprising receiving, at a local computing device comprising an output device configured to output at least one of visual, aural, and tactile output, input instructing the output device to provide output in the form of a notification at a predetermined time, receiving, at a notification manager, contextual information, analyzing, at the notification manager, the contextual information, and cancelling, suppressing, or replacing the notification, at the local computing device, based on the analysis of the contextual information.

According to an additional embodiment, a computer readable medium is disclosed with computer executable instructions for receiving, at a local computing device comprising an output device configured to output at least one of visual, aural, and tactile output, input instructing the output device to provide output in the form of a notification at a predetermined time, receiving, at a notification manager, contextual information, analyzing, at the notification manager, the contextual information, and cancelling, suppressing, or replacing the notification, at the local computing device, based on the analysis of the contextual information

DETAILED DESCRIPTION

Figure 1:
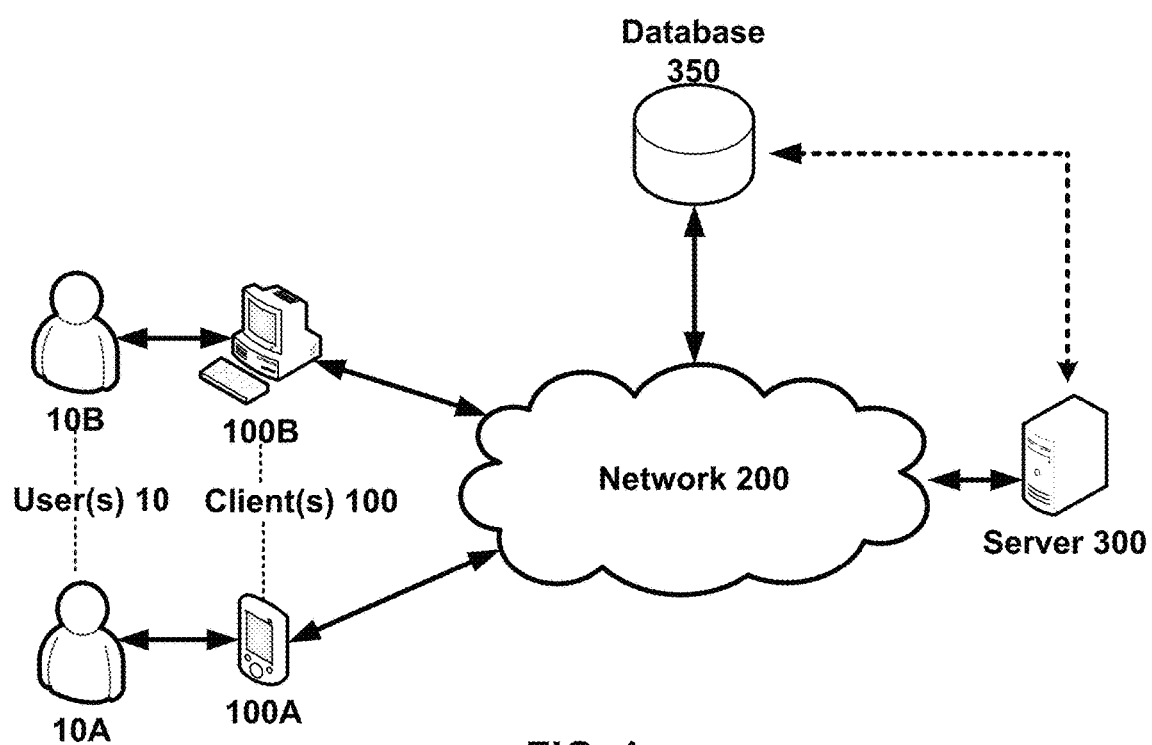
FIG. 1 is a block diagram of an example environment in which the methodology for managing alarms and notifications based on user contextual cues may be implemented.

FIG. 1 is a block diagram of an example environment in which the methodology for managing alarms and notifications based on user contextual cues may be implemented. In the environment depicted by FIG. 1, user(s) 10, including user 10A and user 10B interact with client(s) 100, which include client 100A and client 100B. Client(s) 100 include but are not limited to smart phones, personal digital assistants (PDA), tablet computers, laptop computers, desktop computers, watches with computer operating systems, and video game consoles. In general, a client may be any computerized device capable of storing alarm or notification requests or providing or displaying alarms or notifications.

Client(s) 100 are connected to server 300 and database 350 through network 200. Network 200 may be either a wired or a wireless network, or network 200 may comprise one or more wireless networks and one or more wired networks. Example networks include but are not limited to LTE networks, GSM networks, CDMA networks, fiber optic networks, and other networks using other network architectures. Network 200 enables communication between client(s) 100, server 300, and database 350. Network 200 may include a set of cell towers, as well as a set of base stations and/or mobile switching centers (MSCs). As appreciated by those skilled in the art, the data network may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components, network 200 may include one or more IP multimedia subsystems (IMS), serving gateways (SGW), and evolved node Bs (eNB). One of ordinary skill in the art will recognize that additional components not mentioned herein may be used by network 200.

Network 200 may also include a wireless local area network (WLAN) and a wireless personal area network (WPAN). WLAN and WPAN components of network 200 may enable communication directly between client(s) 100. For example, client 100A could communicate directly with client 100B through WLAN or WPAN network components. Alternatively, client 100A and client 100B may communicate directly through network 200. The WLAN and WPAN network components may include but are not limited to a WiFi connection, a Bluetooth connection, a ZigBee connection, a wireless USB connection, a Z-Wave connection, or an IrDA connection.

Server 300 is connected to client(s) 100 and database 350 through network 200. Server 300 comprises processors and memory configured to transmit information to and receive information from a multitude of client(s) 100 and to query information from and transmit information to database 350. The information received by server 300 from client(s) 100 may include but is not limited to information pertaining to tasks or events that user(s) 10 intend to complete or attend, to user(s) 10 desire to receive notifications or alarms intended remind user(s) 10 of upcoming tasks or events, to contextual information detected, aggregated, or produced by user(s) 10 or client(s) 100, to information pertaining to social network accounts of user(s) 10 or client(s) 100, to information pertaining to electronic payment systems utilized by user(s) 10 or client(s) 100, and any other information developed, aggregated, or acquired by applications running on client(s) 100. Server 300 may also host notification manager applications utilized by client(s) 100. Database 350 is connected to client(s) 100 and server 300 through network 200. Database 350 may store information pertaining to pending alarms and notification as well as information that may be relevant to the relevance of such pending alarms and notification.

In addition to being helpful, reminders and alerts, provided by mobile computerized devices, such as client(s) 100 can be a source of annoyance and interruption to their users. Often times users create event reminders only to later decide not to attend an event and then be interrupted and annoyed by a then unnecessary reminder for the event. Users may set an alarm to wake up at a particular time in the morning only to rise earlier and then be interrupted by a then unnecessary alarm. For example, a user may set an alarm for 7:00 AM, rise at 6:55, and have the alarm begin ringing while the user is in the shower. Such a sequence of events could be annoying for the user, and possibly even more annoying for the user's spouse or roommate who had intended to remain asleep until 8:00 AM. Similarly, a user who sets a reminder on a mobile electronic device to leave for work at 8:00 AM and then leaves at 7:55 AM could be distracted by a loud alarm going off in a handbag or briefcase while driving. The result of such a sequence events could be potentially disastrous. What is needed is a means of automatically identifying and suppressing or eliminating notification alarms and alerts that have become unnecessary as a result of events occurring between the time the notification alarm or alert was set up and the time at which the notification alarm or alert commences.

Implementations of the present disclosure provide methods and systems by which alarms and notifications, which may be maintained, produced, issued, or received by electronic devices, can be managed. Users of electronic devices, such as user(s) 10 of FIG. 1, may request that electronic devices, such as client(s) 100 of FIG. 1, output alarms or notifications. Such alarms or notifications may be intended to remind the user to begin working on or to accomplish a particular task or to attend or initiate a particular event. Alarms and notifications may also be used to cause a user to wake up at a particular time, to purchase a particular item, to travel to a particular location, or merely to provide some particular piece of information to a user. For example, an alarm or notification may be used to remind a user to purchase airline tickets for an upcoming vacation or to inform a user of the score of a football game. In some cases, electronic devices capable of communicating with other electronic devices that output alarms or notifications may schedule alarms or notifications on those other electronic devices. For example, a remote server may schedule alarms or notifications on smart phones belonging to the invitees to a particular meeting in order to remind those invitees of the meeting to, e.g. increase attendance or eliminate delays. Alarms and notifications may be scheduled for a multitude of additional purposes and serve a wide variety of additional functions as well. In other implementations, alerts may be scheduled implicitly based on prior habitual behavior. For example, an alarm clock application may detect that the user of a smart phone habitually wakes up at approximately 7:00 AM everyday Monday through Friday and may initiate a loud alarm if the application detects that the user has not awaken by 7:15 AM on a weekday.

Alerts, such as alarms and notifications, may be, e.g. scheduled, created, maintained, processed, and played on multiple devices. In some implementations, alerts are scheduled, maintained, and played locally on a single computerized electronic device. Such devices include but are not limited to smart phones, personal digital assistants (PDA), tablet computers, laptop computers, and computerized watches. Such devices may be, e.g., any of client(s) 100 in FIG. 1. In other implementations, alerts may be scheduled, created, maintained, processed and played on multiple devices. For example, an alert may be scheduled on a laptop computer and played by a smart phone. In some implementations, an alert manager is located at a remote server, such as server 300, in FIG. 1, and alerts that are created at a local computerized device are pushed to the server by the local computerized device or pulled from the local computerized device by the server. The alert manager may then store or maintain the alert and transmit instructions for playing the alert to the same or a different local computerized device. For example, an alert to remind a user to attend a particular concert could be scheduled at a laptop computer, transmitted to a server where it is stored, and then transmitted to a smart phone for playing. The decision of which local device to transmit instructions for playing can be made pursuant to a variety of methods. The user or the local device at which the alert is scheduled can specify a particular local device at which the alert is to be played. Machine learning algorithms can also be used to determine which local device should be used to play the alert based on a variety of contextual information. In other implementations, an alert created or scheduled at one electronic device can be transmitted directly to another electronic device for playing. For example, the alert to remind the user to attend the particular concert could be created or scheduled at a laptop computer and transmitted directly to a smart phone for playing.

The present disclosure also contemplates an alert manager that is distributed between multiple devices. For example, an alert manager may have components that operate on a client, such as any of client(s) 100 in FIG. 1, and also have other components that operate at a server, such as server 300 in FIG. 1. In some embodiments of the present disclosure, a local alert manager located at a client may handle the scheduling, creation, maintenance, processing, playing, and cancellation of certain alerts, while a remote alert manager located at a server may handle the scheduling, creation, maintenance, processing, playing and cancellation of other alerts. In some instances, an alert may be stored locally at a client, and an alert manager located at a server may adjust the alert. In other instances, an alert stored remotely at a server may be adjusted by a client. In other embodiments, alerts stored locally at a client may only be adjusted by the client while alerts stored remotely at a server may only be adjusted by the server.

In some implementations of the present disclosure, alarms and notifications may be classified pursuant to a taxonomy of alerts. The taxonomy of alerts can be defined according to a variety of rules. Rules may be specified that dictate alerts generated by different applications or different types of applications are to be grouped into different categories. For example, rules may specify that alarms and notifications generated by scheduling applications, such as a calendar or organizer, are to be treated differently than news providing applications, such as applications that track the stock market or applications that monitor the progress of athletic events. Rules may also be specified that dictate that alerts for different types of events are to be categorized differently. For example, alarms and notifications that are designed to instruct users to travel to a particular location may be placed into a different class than rules that instruct users to purchase a particular item. Such rules may rely upon particular language associated with the event. For example, language such as "go to" may specify an alert instructing a user to travel to a particular location while language such as "buy" or "purchase" may specify an alert instructing a user to purchase a particular item. Additional rules may be specified in order to dictate that alarms and notifications that were originated, i.e. initially scheduled, locally by a user of an outputting electronic device are to be classified differently than alerts that were originated external to the outputting electronic device and either pushed to or pulled by the outputting electronic device. The rules provided in this section are nothing more than examples and are not meant to imply any limitation regarding the use of other rules. Furthermore, the examples are not meant to imply any limitation regarding the type of information that may be used by taxonomic rules nor meant to imply any limitation regarding the actual classifications utilized by the taxonomy of alerts.

Implementations of the present disclosure can use contextual information in order to trigger the adjustment, e.g. cancellation, suppression, modification, or replacement of an alert. Contextual information used to trigger the cancellation or suppression of the alert can be acquired from a variety of sources. Contextual information may be developed by one or more sensors within an electronic device, such as one of client(s) 100 in FIG. 1. Sensors may include but are not limited to accelerometers, microphones, light meters (such as components of digital cameras), cameras, GPS chipsets, and WiFi transceivers. Such sensors are capable of developing information pertaining to the present status of a particular client device. For example, an accelerometer can detect small motions of an electronic device that might be too small for a GPS chipset to detect. Such small motions may be indicative of a user of the electronic device moving around in a small area. Similarly, a GPS chipset can determine that the electronic device is travelling over greater distances and determine the speed at which the device is moving. GPS chipsets and wifi transceivers can be used to ascertain the present location of an electronic device. For example, a wifi transceiver can determine the identity of one or more wifi access points from which signals are currently being received and the strength of such signals, query a database containing information pertaining to the locations of the one or more wifi access points, and determine, using techniques such as triangulation, the approximate current location of the electronic device. Information pertaining to the current location of an electronic device and its speed and direction of travel can be used to infer that the electronic device is en route to a particular location.

Contextual information can also be ascertained from a variety of applications executing on computerized electronic devices. For example, an application executing on a smart phone may use input from a microphone on the smart phone to record audio signals in the vicinity of the smart phone. The application can then identify a match between the audio signals recorded by the microphone of the smart phone and other audio signals, which may be, e.g., located in an archive on a database. In instances where an exact match is not found, a variety of algorithms can be used to determine an audio signal that most closely approximates the audio signal recorded by the microphone of the smart phone. The fact that a particular audio signal has been recorded by the microphone of an electronic device may be used to infer that the user of the electronic device is currently watching a particular movie or television show or listening to a particular piece of music. Other applications on an electronic device can determine that a user of the device has communicated with a particular individual or encountered a particular piece of information. For example, text messaging applications, email applications, and dialing applications on smart phones can determine that a user has contacted a particular person and possibly determine the subject matter of the correspondence between the user and the particular person. News applications can determine that a user has accessed a particular news story and web browser applications can determine that a user has accessed a particular website. Social networking applications may be able to determine that a user has contacted a particular person regarding particular subject matter and also ascertain that a user has encountered a particular piece of information. Weather applications may be able to determine both current and future weather conditions in the vicinity of an electronic device.

Not all contextual information need be produced by the electronic device that will output an alert to which the contextual information is relevant. Some contextual information may be provided by other electronic devices or may be ascertained from information located on the internet. For example, various online interactions may provide contextual information that impacts the necessity and usefulness of an alert. Online interactions may include but are not limited to social network interactions, events related to an online video game, e-commerce transactions, visits to websites or web pages, and any activity attributable to one or more user accounts. In some implementations, contextual information may be provided by electronic devices that are registered to a user of an outputting electronic device, that are linked to a user account, or which have accessed a user account corresponding to a user account associated with an outputting electronic device. For example, reprocessing of an alert scheduled to play on a smart phone owned by a particular user may be triggered by a user account being accessed on a public computer, e.g. at a public library, and a particular news story being accessed through that user account. Similarly, reprocessing of an alert scheduled on a smart phone to remind a user to attend a meeting may be triggered by the user's presence at the meeting being ascertained through other means. If an alarm is scheduled to remind a user to attend a meeting, and the user departs for the meeting while leaving the device on which the alert is scheduled to play behind, the alarm may be cancelled if the user logs into the meeting room with, e.g. an electronic key card registered to the user. In other implementations, reprocessing of a reminder pertaining to a task that is to be accomplished with the assistance of another electronic device may be triggered by contextual information provided by the other electronic device that is to assist in the accomplishment of the task. For example, a reminder to go for a training ride on a bicycle may be cancelled if a computerized power meter on the bicycle registers and reports a power output being produced on the bicycle. Similarly, a reminder to watch a particular television show may be cancelled if a smart television reports that a user account corresponding to the reminder has logged into the television and that the television is currently tuned to a particular channel on which the particular show is to play.

In some implementations of the present disclosure, the reprocessing of the alerts may vary depending upon the classification of the alert and the particular trigger causing the reprocessing. In some implementations, alerts can be automatically cancelled silently without any notification provided to a user. Such outright cancellation without notice would be optimal in situations where an alert is determined to be unwanted and unnecessary with a high level of confidence or where the error costs associated with cancelling an alert that would have nevertheless had some utility are low. In other implementations, reprocessing may involve automatically cancelling original alarms and notifications while also creating a new alert. The new alert may inform of the cancellation of the original alert, may be provided through different means than the original alert, and may be given a lower priority than the original alert. In some implementations, the new alert informs of the rationale for cancelling the original alert. For example, a notification reminding a user to "call mom and wish her a happy birthday" may automatically be cancelled and a new alert may inform the user that "dialer recorded a call to Mom at 9:37 AM; words 'happy birthday' were spoken." In other implementations, a new alert may be created that prompts a user or client to cancel an original alert. Such an alert may include a button or link that allows the user to cancel the original alert with a single action. In some implementations, the new alert prompting the user to cancel the original alert may include an explanation of why the prompt is being issued. In other implementations, the new alert does not include information including an explanation of why the prompt is being issued. In yet other implementations, the decision of whether or not to include an explanation of why the prompt is being issued is made based upon the classification of the alert and the type of information that served as the trigger for the reprocessing.

Figure 2:
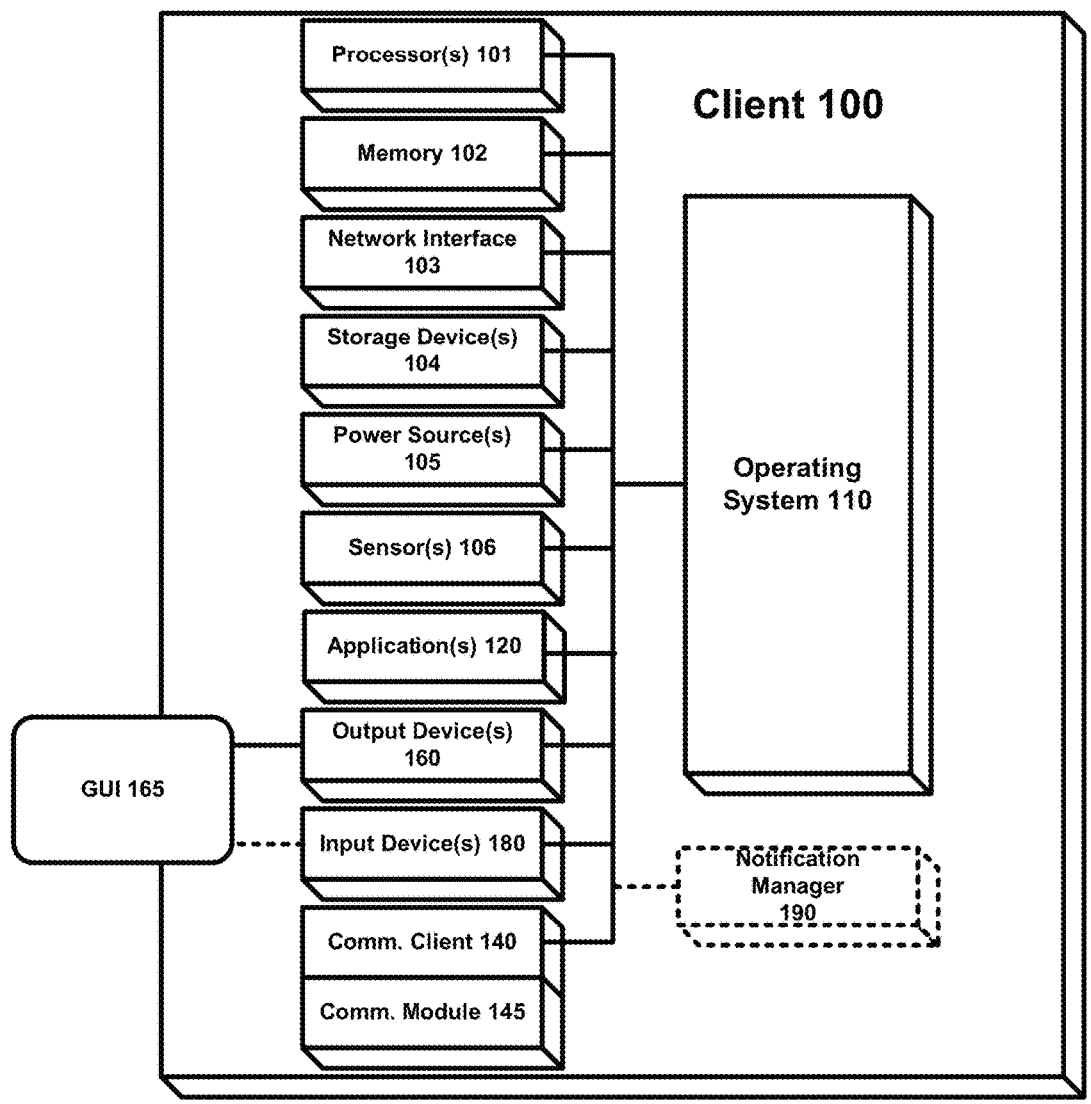
FIG. 2 is a block diagram of basic functional components of a client in FIG. 1, according to one aspect of the disclosure.

Turning now to FIG. 2, one particular example of a client 100, e.g. an electronic device such as a smart phone, a tablet PC, a personal digital assistant (PDA), a laptop computer, or a computerized watch, is illustrated. The preceding list of example clients is not intended to be exhaustive, and the examples are not meant to imply any limitation regarding the possibility that other devices not listed may serve as clients. In general, many other embodiments of the client 100 may be used as long as the embodiments are capable of creating, scheduling, maintaining, or playing a notification or alarm.

In the illustrated embodiment of FIG. 2, the client 100 includes one or more processors 101, memory 102, a network interface 103, one or more storage devices 104, a power source 105, one or more sensors 106, one or more applications 120, one or more output devices 160, one or more input devices 180, a communication client 140, a communication module 145, and a notification manager 190. Client 100 also includes a graphical user interface (GUI) 165 connected to the one or more output devices 160 and the one or more input devices 180. The client 100 also includes an operating system 110. In a conventional fashion, each of components 101, 102, 103, 104, 105, 106, 120, 160, 180, 140, 145, 190, and 165 are interconnected physically, communicatively, and/or operatively for inter-component communications.

As illustrated, processors 101 are configured to implement functionality and/or process instructions for execution within client 100. For example, processors 101 execute instructions stored in memory 102 or instructions stored on storage devices 104. Memory 102, which may be a non-transient, computer-readable storage medium, is configured to store information within client 100 during operation. In some embodiments, memory 102 includes a temporary memory, i.e. an area for information not to be maintained when the client 100 is turned off. Examples of such temporary memory include volatile memories such as random access memories (RAM), dynamic random access memories (DRAM), and static random access memories (SRAM). Memory 102 also maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client 100 uses network interface 103 to communicate with external devices via one or more networks, such as network 200 of FIG. 1. Such networks may include one or more wireless networks, wired networks, fiber optics networks, and other types of networks through which communication between the client 100 and an external device may be established. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the client 100 uses network interface 103 to wirelessly communicate with peripheral devices such as routers, headsets, speakers, microphones, headphones, and visual displays.

The client 100 includes one or more power sources 205 to provide power to the client. Non-limiting examples of power source 205 include single-use power sources, rechargeable power sources, and/or power sources developed from nickel-cadmium, lithium-ion, or other suitable material.

The client 100 includes one or more sensors 106. Non-limiting examples of sensors include an accelerometer, a wifi transceiver, a GPS chipset, a microphone, and a light meter. One or more applications 120 also reside on client 100. Non-limiting examples of applications include a dialer application, a weather application, an email application, a social network application, a calendar application, an alarm clock application, a reminder application, and news source applications.

One or more output devices 160 are also included in client 100. Output devices 160 are configured to provide output to a user using tactile, audio, and/or video stimuli. Output devices 160 may include a display screen (which may be part of a presence-sensitive screen), a sound card, a video graphics adapter card, or any other type of device for converting a signal into an appropriate form understandable to humans or machines. Additional examples of output devices 160 include a speaker, a cathode ray tube (CRT) monitor, a liquid crystal display (LCD), or any other type of device that can generate intelligible output to a user.

Client 100 also includes one or more input devices 180. Input devices 180 are configured to receive input from a user through tactile, audio, and/or video feedback. Non-limiting examples of input devices 180 include a presence-sensitive screen, a mouse, a keyboard, a voice responsive system, video camera, microphone or any other type of device for detecting a command from a user. In some implementations, a presence-sensitive screen includes a touch-sensitive screen.

A graphical user interface (GUI) 165 is provided by output devices 160 and capable of receiving commands from a user via input devices 180. GUI 165 may provide an interface wherein a user can schedule or generate a request for an alert. GUI 165 may also provide a medium wherein an alert, alarm, or notification may be output to a user, delayed or postponed by a user, or rescheduled by a user. Client 100 also includes a communication client 140, a communication module 145, and a notification manager 190. Communication client 140, communication module 145, and notification manager 190 include program instructions and/or data that are executable by client 100. In some implementations, notification manager 190 does not reside on client 100 but instead resides at server 300.

Communication client 140 and communication module 145 may establish a communication channel with other clients. For example, communication client 140 and communication module 145 may be used to transmit information pertaining to an alert, such as an alarm or notification, directly between one client to another client. Notification manager 190 receives information pertaining to alerts from a variety of sources that can be termed notification generators and receives additional information pertaining to the relevance of such alerts from a variety of sources that can be termed context information providers. Notification manager 190 includes program instructions and/or data that are executable by client 100 or server 300 and that allow client 100 or server 300 to classify alerts, detect information impacting the continued relevance or value of an alert, and adjust alerts if it is found that the alerts are no longer relevant.

The client 100 further includes an operating system 110 such as the Android® operating system. The operating system 110 controls operations of the components of the client 100. For example, the operating system 110 facilitates the interaction of notification manager 190, applications 120, and GUI 165 with processors 101, memory 102, network interface 103, storage device(s) 104, power source 105, sensors 106, output devices 160, and input devices 180. In some embodiments, notification manager 190 forms a part of operating system 110 executing on client 100.

Figure 3:
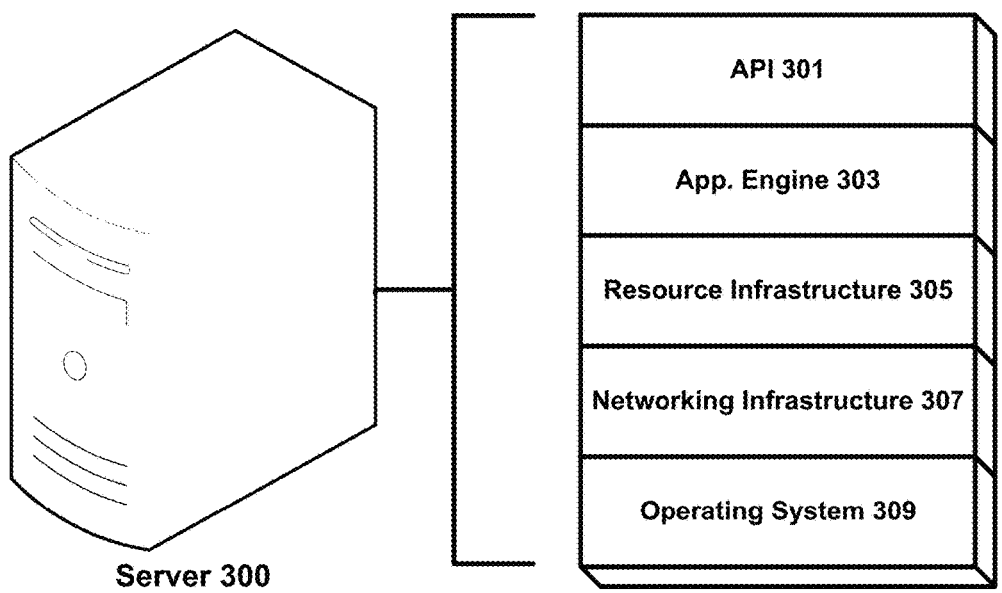
FIG. 3 is a block diagram of basic functional components of a server in FIG. 1, according to one aspect of the disclosure.

Moving to FIG. 3, in one embodiment, an application programming interface (API) 301 of an Application Engine or App Engine 303 provides many resources to the notification manager 190. In turn, the App Engine 303 depends on resources provided from an API exposed by an Resource Infrastructure Layer 305 and a Networking Infrastructure Layer 307, which are supported by the server 300 and its Operating Systems 309. The App Engine 303 and the Resource Infrastructure Layer 305 connect HTTP requests from the client. The App Engine 303 also provides a runtime environment for the notification manager. The App Engine 303 also provides access to a database in the Resource Infrastructure Layer 305 for persistent storage requirements of the activities of the notification manager 190.

Through its API 301, the App Engine 303 provides the communications sessions 340 access to resources on the Internet, such as web services or other data. The App Engine 303 retrieves web resources using the Resource Infrastructure Layer 305. The notification manager 190 may also send and receive messages using the App Engine 303 and the Resource Infrastructure Layer 305. The App Engine 303 and the Resource Infrastructure Layer 305 also support a cache, which is useful for temporary data or data copied from a database to the cache for high speed access. The Resource Infrastructure Layer 305 also supports a file system and scheduling resources. An example of the App Engine is Google's App Engine. An example of the Resource Infrastructure Layer 305, the Networking Infrastructure Layer 307 and the Operating System 309 is Google's supporting infrastructure and operating system for its App Engine.

Figure 4:
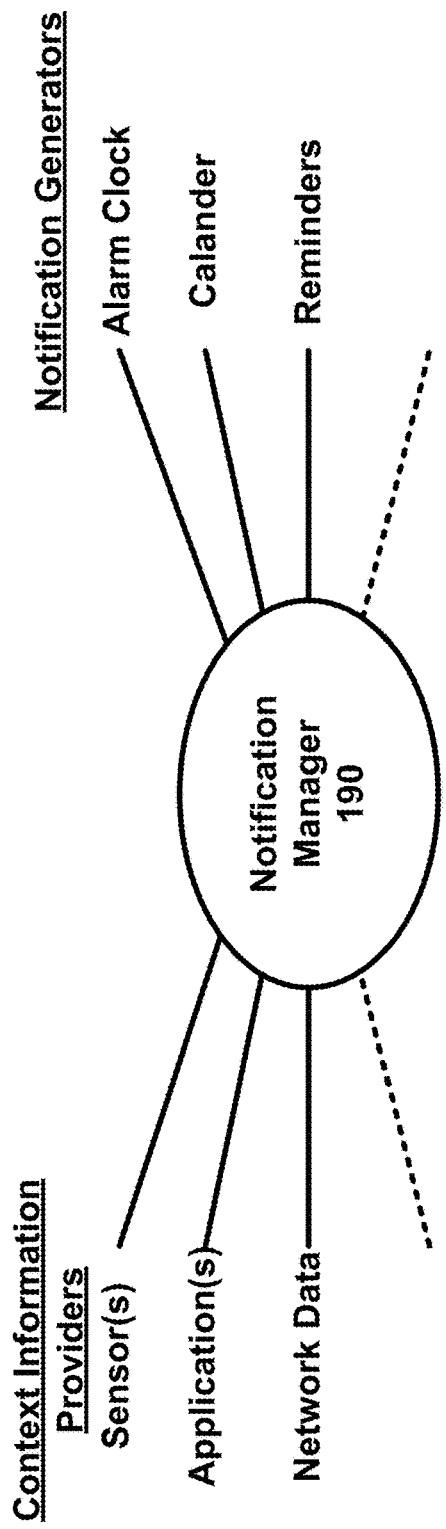
FIG. 4 is a block diagram of the various sources of information for a notification manager in FIG. 2, according to one aspect of the disclosure.

FIG. 4 is a block diagram of a notification manager and the various inputs into an example notification manager and the various applications to which the notification manager is connected, according to one aspect of the disclosure. The notification manager 190 may reside on a client, such as client 100 as depicted in FIG. 2, or at a remote location such as server 300. Alternatively, the functionality provided by the notification manager 190 may be implemented at both a client, such as client 100, and at a remote location, such as server 300. In general, notification manager 190 may schedule, maintain, manage, issue, classify, cancel, suppress, replace, and modify alerts regardless of whether notification manager 190 resides locally on a device that provides a user with tactile, audio, video, or other types of alerts or whether the notification manager 190 resides at a remote location and transmits information pertaining to alerts to local devices that provide users with tactile, audio, video, or other types of alerts.

Notification manager 190 may be connected to both notification generators and to context information providers and is capable of both receiving information from and transmitting information to such notification generators and context information providers. Notification generators may be applications residing and/or executing on a client, such as client 100, or applications residing or executing on a server, such as server 300. For example, notification generators may include but are not limited to alarm clock applications, calendar applications, reminder applications, news source applications, and to-do list applications, regardless of whether such applications reside at a client or at a remote location. Notification generators generally include any source of a notification request or any medium into which a user may, either explicitly or implicitly, express the intent to generate a notification, so long as the notification generator is capable of being communicatively coupled to the notification manager 190. For example, a user may implicitly express the intent to generate a notification to remind the user of an upcoming movie or flight by purchasing tickets for a movie or flight.

In addition to connections to notification generators, notification manager 190 is also connected to context information providers. Context information providers may include but are not limited to sensors, such as sensors 106, applications, such as applications 120, and network data. Network data may include but is not limited to data pertaining to one or more user accounts stored at a remote database, data created by other electronic devices connected to a network to which a client 100 is connected, and data located on the internet. In general, network data can be data that is stored at any location accessible to a client. Context information providers convey information pertaining to the current context of a client or of a user of a client, such as one of user(s) 10 depicted in FIG. 1. Specific non-limiting examples of context information providers include a digital camera built into a smart phone, the light meter in a digital camera built into a smart phone, a social network application residing on a smart phone, a database maintained by a social network, a database maintained by an email service, a dialing application on a smart phone, and an accelerometer in a computerized watch. In general, a context information provider can be any source of contextual cues that may indicate that an alert is no longer relevant to or desired by a user.

Context information providers provide contextual information that can be used by the notification manager 190 to determine that a notification scheduled or created by a notification generator should be adjusted. Adjustment of a notification may include but is not limited to reprocessing or reevaluating a notification request and canceling, suppressing, modifying, or replacing the notification. The contextual information provided by context information providers may include but is not limited to information pertaining to location, motion, weather, a transaction, brightness, atmospheric pressure, temperature, biometrics, online interactions, an image, sound, and information produced or received by an application executing on a computer readable medium. In general, the contextual information may include any information accessible by a client or server. Online interactions may include but are not limited to social network interactions, events related to an online video game, e-commerce transactions, visits to websites or web pages, and any activity attributable to one or more user accounts.

For example, an image captured by a camera, a series of images captured by a camera, or sound picked up by a microphone may all be provided to the notification manager and used by the notification manager to determine that a notification should be, e.g., reprocessed. Similarly, information pertaining to a transaction or exchange, such as an online bill payment, may be provided to the notification manager and used by the notification manager to determine that a reminder to make a payment should be reprocessed.

In some implementations, the notification manager 190 classifies alerts according to a taxonomy of alerts and the determination of whether or not an alert should be reprocessed is dependent upon the classification of the alert. For example, an alert classified as a purchase reminder may be reprocessed based upon information received from an email application pertaining to a receipt emailed to an email account linked to a client or to a user.

Figure 5:
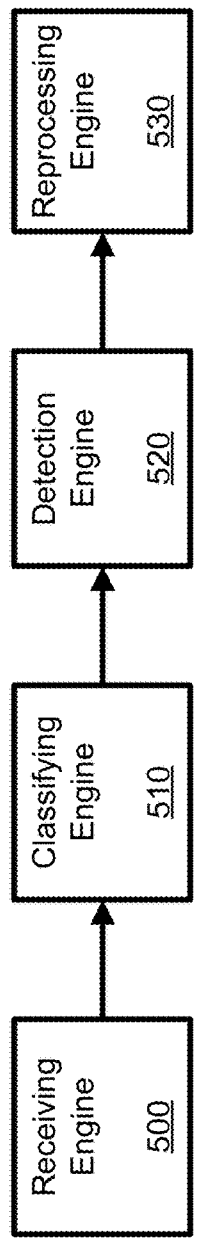
FIG. 5 is a block diagram of the various states of a notification manager during the process of cancelling or suppressing an alarm or notification based on user contextual cues, according to one aspect of the disclosure.

FIG. 5 is a block diagram of the various states of a processer executing instructions or data provided by the notification manager during the process of cancelling or suppressing an alarm or notification based on user contextual cues, according to one aspect of the disclosure. At 500, the processor is configured as a receiving engine. The receiving engine receives information pertaining to an alert, such as an alarm or a notification. The receiving engine may receive information that identifies the application responsible for scheduling or generating the alert and that identifies a user profile associated with the scheduling or generation of the alert. Additionally, the receiving engine may receive information pertaining directly to the alert itself. For example, the receiving engine may receive information indicating that an alarm clock application will initiate, or produce, an alarm at 7:00 AM every weekday. The receiving engine may receive information by virtue of previously sending a request for the information to the entity responsible for providing the information, and the receiving engine may also receive information by virtue of having the information pushed to it by the entity responsible for providing the information.

At 510, the processor is configured as a classifying engine. The classifying engine determines an appropriate categorization of an alert received by the receiving engine at 500. In some implementations, the classification performed by the classifying engine adheres to rules establishing a taxonomy of alerts. The taxonomy of alerts can be defined according to a variety of rules. Rules may be specified that dictate that alerts generated by different applications or different types of applications are to be grouped into different categories. For example, rules may specify that alarms and notifications generated by scheduling applications, such as a calendar or organizer, are to be treated differently than news providing applications, such as applications that track the stock market or applications that monitor the progress of athletic events. Rules may also be specified that dictate that alerts for different types of events are to be categorized differently. For example, alarms and notifications that are designed to instruct users to travel to a particular location may be placed into a different class than rules that instruct users to purchase a particular item. Such rules may rely upon particular language associated with the event. For example, language such as "go to" may specify an alert instructing a user to travel to a particular location while language such as "buy" or "purchase" may specify an alert instructing a user to purchase a particular item. Additional rules may be specified in order to dictate that alarms and notifications that were originated, i.e. initially scheduled, locally by a user of an outputting electronic device are to be classified differently than alerts that were originated external to the outputting electronic device and either pushed to or pulled by the outputting electronic device. The rules provided in this section are nothing more than examples and are not meant to imply any limitation regarding the use of other rules. Furthermore, the examples are not meant to imply any limitation regarding the type of information that may be used by taxonomic rules nor meant to imply any limitation regarding the actual classifications utilized by the taxonomy of alerts.

At 520, the processor is configured as a detection engine. The detection engine detects contextual information that is relevant to whether or not a pending alert is relevant or desired by a user or a client. In some implementations, the detection engine actively detects information by periodically querying information sources for certain types of information. In other implementations the detection engine passively detects information by receiving transmission initiated by information sources. Regardless of whether the detection is active or passive, the detection engine is designed to detect information relevant to whether or not a pending alert is relevant or desired. For example, if information indicating that an alarm is to be produced at 7:00 AM by an alarm clock application on a smart phone, and the detection engine receives information from an accelerometer in a smart phone at 6:55 AM indicating that the smart phone has undergone several small, sudden movements, the information may be relevant to whether the 7:00 AM alarm is relevant.

At 530, the processor is configured as a reprocessing engine. The reprocessing engine adjusts a pending alarm. Depending upon the information associated with the alert received at 500 and the information received by the detection engine at 520, the reprocessing engine may deal with a pending alarm in different manners. In some implementations, the reprocessing engine adjusts alerts automatically without providing any notification of the cancellation to a user. In other implementations, the reprocessing engine automatically cancels or otherwise adjusts existing alarms and notifications while also issuing a new alert. When issuing the new alert, the reprocessing engine may inform a user or client of the adjustment of the original alert, may provide the new alert through different means or in a different manner than the original alert was to be provided, and may give a lower priority to the new alert than the original alert had. In some implementations, the reprocessing engine issues a new alert informing a user of the rationale for adjusting the original alert. In further implementations, the reprocessing engine generates a new alert that prompts a user or client to cancel or otherwise adjust an original alert. Such an alert may include a button or link, e.g. in a GUI such as GUI 165, that allows the user to cancel or otherwise adjust the original alert.

Figure 6:
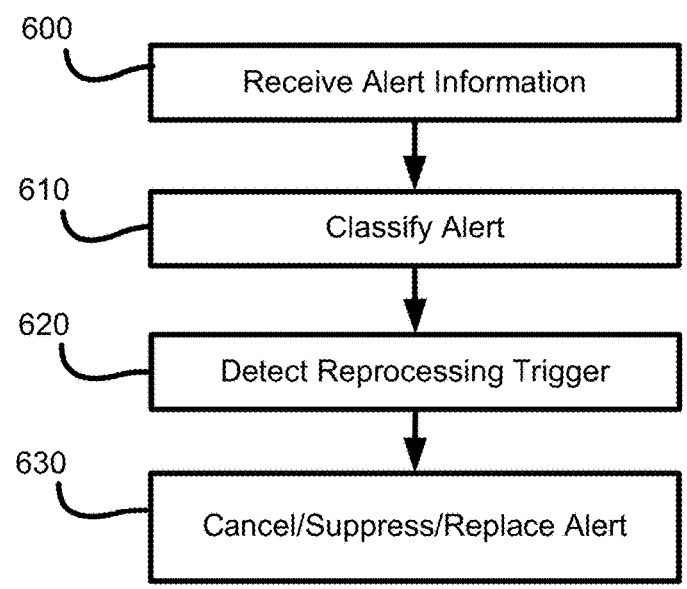
FIG. 6 is a flow diagram illustrating an example method for cancelling or suppressing an alarm or notification based on user contextual cues, according to one aspect of the disclosure.

FIG. 6 is a flow diagram illustrating an example method for cancelling or suppressing an alarm or notification based on user contextual cues, according to one aspect of the disclosure. At 600, information pertaining to an alert is received. Such information may include the identity of the entity responsible for generating or scheduling the alert as well as information pertaining directly to the alert itself.

At 610, the alert is classified pursuant to rules establishing a taxonomy of alerts. The taxonomy of alerts can be defined according to a variety of rules. Rules may be specified that dictate that alerts generated by different applications or different types of applications are to be grouped into different categories. For example, rules may specify that alarms and notifications generated by scheduling applications, such as a calendar or organizer, are to be treated differently than news providing applications, such as applications that track the stock market or applications that monitor the progress of athletic events. Rules may also be specified that dictate that alerts for different types of events are to be categorized differently. For example, alarms and notifications that are designed to instruct users to travel to a particular location may be placed into a different class than rules that instruct users to purchase a particular item. Such rules may rely upon particular language associated with the event. For example, language such as "go to" may specify an alert instructing a user to travel to a particular location while language such as "buy" or "purchase" may specify an alert instructing a user to purchase a particular item. Additional rules may be specified in order to dictate that alarms and notifications that were originated, i.e. initially scheduled, locally by a user of an outputting electronic device are to be classified differently than alerts that were originated external to the outputting electronic device and either pushed to or pulled by the outputting electronic device. The rules provided in this section are nothing more than examples and are not meant to imply any limitation regarding the use of other rules. Furthermore, the examples are not meant to imply any limitation regarding the type of information that may be used by taxonomic rules nor meant to imply any limitation regarding the actual classifications utilized by the taxonomy of alerts.

At 620, the a reprocessing trigger is detected. In some implementations, the reprocessing trigger is detected by virtue of periodically querying information sources for certain types of information. In other implementations the reprocessing trigger is received by virtue of receiving a transmission initiated by an information source. The reprocessing trigger may include but is not limited to information pertaining to location, motion, weather, a transaction, brightness, atmospheric pressure, temperature, biometrics, online interactions, an image, sound, and information produced or received by an application executing on a computer readable medium. Such online interactions may include but are not limited to social network interactions, events related to an online video game, e-commerce transactions, visits to websites or web pages, and any activity attributable to one or more user accounts. For example, any online interaction involving a user account, whether directly or indirectly, such as checking into a location, accessing a website or webpage, or entering into a transaction such as a purchase or other type of exchange, may serve as a trigger for reprocessing an alert or notification.

At 630, the alert for which information was received at 600 is adjusted. Adjustment of a notification may include but is not limited to reprocessing or reevaluating a notification request and canceling, suppressing, modifying, or replacing the notification. In some implementations, the decision of whether or not to cancel, suppress, or replace the alert, or to perform a combination thereof, is based upon the information received at 600 and the particular reprocessing trigger detected at 620. In some implementations, alerts are adjusted automatically without notice of the cancellation being provided to a user. In other existing alarms and notifications are adjusted while also being replaced with a new alert. The replacement alert may inform a user or client of the adjustment of the original alert, may be provided through different means or in a different manner than the original alert was to be provided, and may be given a lower priority than the original alert had. In some implementations, the new alert may include information concerning the rationale for adjusting the original alert. In further implementations, the replacement alert may prompt a user or client to cancel or otherwise adjust an original alert. Such a replacement alert may include a button or link, e.g. provided by a GUI such as GUI 165, that allows the user to cancel or otherwise adjust the original alert.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   scheduling, by a computing device, an alarm for reminding a user of the computing device to complete a task at a predetermined time, wherein the computing device is a mobile phone or a tablet computer;
   receiving, by the computing device, contextual information associated with a computerized watch that is distinct from the computing device and is associated with the user of the computing device, wherein the contextual information includes information pertaining to a current geographic location of the computerized watch, the current geographic location of the computerized watch being different than a current geographic location of the computing device; and
   prior to the computing device outputting the alarm at the predetermined time and from the current geographic location of the computing device:
      determining, by the computing device, based on the contextual information, that the user is at the current geographic location of the computerized watch and not at the current geographic location of the computing device;
      determining, by the computing device, based on the current geographic location of the computerized watch, whether the user has already completed, or is currently completing, the task; and
      responsive to determining that the user has already completed, or is currently completing, the task, cancelling, by the computing device, the alarm to prevent the alarm from being output at the current geographic location of the computing device.

2. The method of claim 1, wherein the alarm is a first alarm, the task is a first task, and the predetermined time is a first predetermined time, the method further comprising:
   scheduling, by the computing device, a second alarm for reminding the user of the computing device to complete a second task at a second predetermined time;
   prior to the computing device outputting the second alarm at the second predetermined time:
      determining, by the computing device, based on the contextual information, whether the user has already completed, or is currently completing, the second task; and
      responsive to determining that the user has not already completed, or is not currently completing, the second task, outputting, by the computing device, the second alarm.

3. The method of claim 1, wherein the contextual information further includes information pertaining to one or more movements of the computerized watch.

4. The method of claim 1, wherein scheduling the alarm comprises scheduling, by the computing device, based on information obtained about prior behavior of the user, the alarm.

5. The method of claim 1, wherein receiving the contextual information comprises receiving, by the computing device, via a direct communication channel with the computerized watch, the contextual information.

6. The method of claim 5, wherein the direct communication channel is a Bluetooth® or Wi-Fi® connection between the computing device and the computerized watch.

7. The method of claim 1, wherein receiving the contextual information comprises receiving, by the computing device, via a remote computing system that is in direct communication with the computerized watch, the contextual information.

8. The method of claim 1, further comprising: after cancelling the alarm, outputting, by the computing device, a notification indicating that the alarm was canceled.

9. The method of claim 1, further comprising:
prior to determining that the user has already completed, or is currently completing, the task, outputting, by the computing device, a first notification indicating that the alarm is pending; and
after cancelling the alarm in response to determining that the user has already completed, or is currently completing, the task, outputting, by the computing device, a second notification indicating that the alarm was canceled.

10. A system comprising:
a network;
a computing device, wherein the computing device is a mobile phone or a tablet computer; and
a computerized watch configured to output, to the network, contextual information associated with the computerized watch, wherein the contextual information includes information pertaining to a current geographic location of the computerized watch, the current geographic location of the computerized watch being different than a current geographic location of the computing device,
wherein the computing device is configured to:
schedule an alarm for reminding a user of the computing device to complete a task at a predetermined time;
receive, via the network, the contextual information associated with the computerized watch; and
prior to the computing device outputting the alarm at the predetermined time:
determine, based on the contextual information, that the user is at the current geographic location of the computerized watch and not at the current geographic location of the computing device;
determine, based on the current geographic location of the computerized watch, whether the user has already completed, or is currently completing, the task; and
responsive to determining that the user has already completed, or is currently completing, the task, cancel, the alarm to prevent the alarm from being output at the current geographic location of the computing device.

11. The system of claim 10, wherein the computerized watch comprises one or more sensors configured to detect the current geographic location of the computerized watch and one or more movements associated with the computerized watch, and wherein the contextual information includes an indication of the one or more movements associated with the computerized watch.

12. The system of claim 10, wherein the network comprises a Bluetooth® or Wi-Fi® network connection between the computing device and the computerized watch.

13. The system of claim 10, wherein the computing device comprises an output device and the computing device is configured to output a notification indicating that the alarm was canceled.

14. A computer-readable storage medium comprising instructions that, when executed by at least one processor of a computing device, configure the at least one processor to:
schedule an alarm for reminding a user of the computing device to complete a task at a predetermined time, wherein the computing device is a mobile phone or a tablet computer;
receive contextual information associated with a computerized watch that is distinct from the computing device and is associated with the user of the computing device, wherein the contextual information includes information pertaining to a current geographic location of the computerized watch, the current geographic location of the computerized watch being different than a current geographic location of the computing device; and
prior to outputting the alarm at the predetermined time and from the current geographic location of the computing device:
determine, based on the contextual information, that the user is at the current geographic location of the computerized watch and not at the current geographic location of the computing device;
determine, based on the current geographic location of the computerized watch, whether the user has already completed, or is currently completing, the task; and
responsive to determining that the user has already completed, or is currently completing, the task, cancel the alarm to prevent the alarm from being output at the current geographic location of the computing device.

15. The computer-readable storage medium of claim 14, wherein the alarm is a first alarm, the task is a first task, the predetermined time is a first predetermined time, and the instructions, when executed, further configure the at least one processor to:
schedule a second alarm for reminding the user of the computing device to complete a second task at a second predetermined time;
prior to outputting the second alarm at the second predetermined time:
determine, based on the contextual information, whether the user has already completed, or is currently completing, the second task; and
responsive to determining that the user has not already completed, or is not currently completing, the second task, output the second alarm.

16. The computer-readable storage medium of claim 14, wherein the predetermined time is a first predetermined time, and the instructions, when executed, further configure the at least one processor to:
determine, based on the contextual information associated with the computerized watch, an adjustment to the alert; and
prior to outputting the alert at the predetermined time, reschedule, based on the adjustment, the alarm for reminding the user of the computing device to complete the task by a second predetermined time that is different than the first predetermined time.

17. The computer-readable storage medium of claim 14, wherein the instructions, when executed, further configure the at least one processor to:
  prior to determining that the user has already completed, or is currently completing, the task, output a first notification indicating that the alarm is pending; and
  after cancelling the alarm in response to determining that the user has already completed, or is currently completing, the task, output a second notification indicating that the alarm was canceled.

18. The computer-readable storage medium of claim 14, wherein the predetermined time is a first predetermined time, and the instructions, when executed, further configure the at least one processor to receive the contextual information from the computerized watch or from a remote computing system that is in direct communication with the computerized watch.

* * * * *